(12) United States Patent
Hajimiri et al.

(10) Patent No.: US 7,274,230 B2
(45) Date of Patent: Sep. 25, 2007

(54) SYSTEM AND METHOD FOR CLOCKLESS DATA RECOVERY

(75) Inventors: Seyed-Ali Hajimiri, Pasadena, CA (US); Behnam Analui, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 714 days.

(21) Appl. No.: 10/423,378

(22) Filed: Apr. 25, 2003

(65) Prior Publication Data

US 2003/0202622 A1     Oct. 30, 2003

Related U.S. Application Data

(60) Provisional application No. 60/375,748, filed on Apr. 26, 2002.

(51) Int. Cl.
*H03L 7/06* (2006.01)
*H04L 7/02* (2006.01)
*G06F 1/12* (2006.01)

(52) U.S. Cl. ............... 327/158; 375/359; 713/401

(58) Field of Classification Search ............... 375/354, 375/359; 713/400, 401; 327/158
See application file for complete search history.

(56) References Cited

U.S. PATENT DOCUMENTS 5,552,733 A * 9/1996 Lesmeister ............... 327/295
5,640,398 A 6/1997 Carr et al. ............... 370/376
5,787,273 A * 7/1998 Runaldue ............... 713/500
6,205,180 B1 * 3/2001 Dutey ............... 375/240.25
7,042,971 B1 * 5/2006 Flanagan et al. ........... 375/376
2001/0044708 A1 * 11/2001 Talwar et al. ............... 703/2

FOREIGN PATENT DOCUMENTS

DE      19723539 A1    12/1998
EP      0 987 851 A    3/2000

OTHER PUBLICATIONS

Search Report for PCT/US03/12932 Dated Oct. 15, 2003 in co-pending PCT filing of U.S. application filed herewith.
Schaffner, Mario R., "A Computer Modeled After an Automation", Proceedings of the Symposium on Computers and Automata, held in Brooklyn, New York, Apr. 13-15, 1971, Polytechnic Press, US, vol. PROC. 1971, Apr. 13, 1971, pp. 635-650, XP002041884.
Loukianov, Dmitrii A., "PROM State Machine Decodes Data", *EDN Electric Design News*, Cahners Publishing Co., Newton, Massachusetts, US, vol. 37, No. 12, Jun. 4, 1992, pp. 146 & 148, XP000256811, ISSN: 0012-7515.

* cited by examiner

*Primary Examiner*—David C. Payne
*Assistant Examiner*—Aslan Ettehadieh
(74) *Attorney, Agent, or Firm*—Jackson Walker L.L.P.; Christopher J. Rourk (57) ABSTRACT

A system for clockless synchronous data recovery is provided. The system includes an input rate demultiplexer receiving a serial data stream of bits of data transmitted at a bit rate and generating two or more parallel data streams from the serial data stream. One or more delays coupled to the input rate demultiplexer each receives one of the generated parallel serial data streams and delays bits of data and feeds them back to the input rate demultiplexer.

5 Claims, 7 Drawing Sheets

| | | | | IN = 0 | | | IN = 1 | | | | |
|---|---|---|---|---|---|---|---|---|---|---|---|
| | Y0 | Y1 | Y2 | Y0' | Y1' | Y2' | Y0' | Y1' | Y2' | O1 | O2 |
| A | 0 | 0 | 0 | 0 | 0 | 1 | 0 | 1 | 0 | 0 | 0 |
| B | 1 | 0 | 1 | 1 | 0 | 0 | 1 | 0 | 1 | 0 | 1 |
| C | 0 | 0 | 1 | 0 | 0 | 0 | 1 | 0 | 1 | 0 | 0 |
| D | 0 | 1 | 0 | 0 | 1 | 1 | 1 | 1 | 0 | 1 | 0 |
| E | 1 | 0 | 0 | 0 | 0 | 0 | 1 | 0 | 1 | 0 | 1 |
| F | 1 | 1 | 1 | 0 | 1 | 1 | 1 | 1 | 0 | 1 | 1 |
| G | 1 | 1 | 0 | 1 | 0 | 0 | 1 | 1 | 1 | 1 | 1 |
| H | 0 | 1 | 1 | 0 | 0 | 1 | 0 | 1 | 0 | 1 | 0 |

TABLE 404

SYSTEM AND METHOD FOR CLOCKLESS DATA RECOVERY

RELATED APPLICATIONS

This application claims priority to U.S. Provisional Application No. 60/375,748, Filed Apr. 26, 2002, entitled "Clockless synchronous data recovery and demultiplexing," Behnam Analui and Seyed Ali Hajimiri, inventors, which is hereby incorporated for reference for all purposes.

FIELD OF THE INVENTION

The present invention relates to data recovery, and in particular, to clockless data recovery that allows high frequency data to be recovered without data loss and demultiplexed into two or more parallel data streams having proportionally slower data transmission frequencies.

BACKGROUND OF THE INVENTION

Data recovery is known in the art. Such data recovery techniques include a clock operating in conjunction with a phase-locked loop, which is used to monitor a communications medium for transmitted data. When data transmission is initiated over the communications medium, the phase locked loop will eventually synchronize with the received data, although a period of time can pass during which the received data is lost prior to synchronization. The accuracy of the clock is an important factor in the ability of the transmitted data to be accurately and quickly recovered.

SUMMARY OF THE INVENTION

In accordance with the present invention, a system and method for clockless data recovery is provided that can be used to receive transmitted data without the need for high frequency clocks.

In particular, a system for clockless data recovery is provided that allows data to be recovered without the need for data losses to be incurred while a phase locked loop locking process is performed.

In accordance with an exemplary embodiment of the present invention, a system for clockless synchronous data recovery is provided. The system includes an input rate demultiplexer receiving a serial data stream of bits of data transmitted at a bit rate and generating two or more parallel data streams from the serial data stream. One or more delays coupled to the input rate demultiplexer each receives one or more of the generated parallel serial data streams and selectively delays bits of data and feeds them back to the input rate demultiplexer.

The present invention provides many important technical advantages. One important technical advantage of the present invention is a system for clockless data recovery that does not require a clock to be used to recover data transmitted at high data transmission frequencies.

Those skilled in the art will further appreciate the advantages and superior features of the invention together with other important aspects thereof on reading the detailed description that follows in conjunction with the drawings.

DETAILED DESCRIPTION OF THE INVENTION

In the description that follows like parts are marked throughout the specification and drawings with the same reference numerals, respectively. The drawing figures are not necessarily to scale and certain features may be shown in somewhat generalized or schematic form in the interest of clarity and conciseness.

Figure 1:
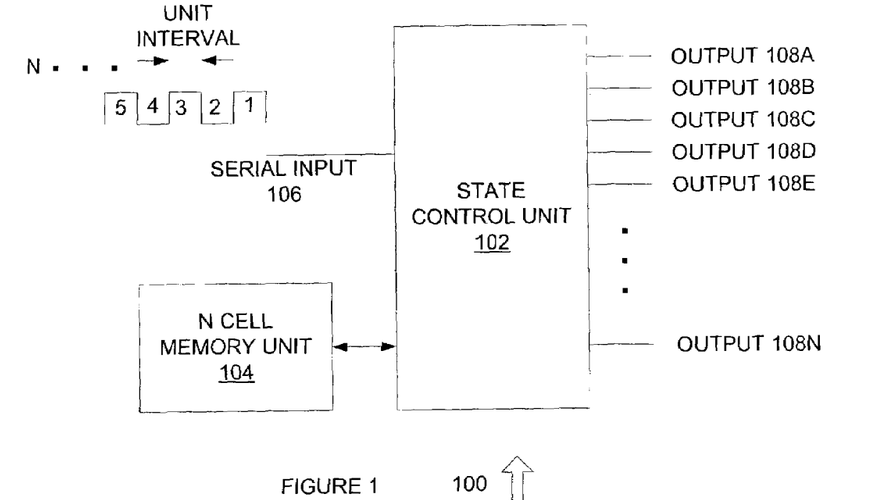
FIG. 1 is a diagram of a system for clockless data recovery in accordance with an exemplary embodiment of the present invention.

FIG. 1 is a diagram of a system 100 for clockless data recovery in accordance with an exemplary embodiment of the present invention. System 100 allows data recovery to be performed without requiring a clock for timing that is synchronized with the data transmission rate.

System 100 includes state control unit 102 and N cell memory unit 104. State control unit 102 is a generic state machine with a number of internal states or memories, and N cell memory 104 can generate an appropriate output based on a predefined functionality related to the input signal and some or all of output signals. N cell memory unit 104 has at least a single unit interval memory, which in one exemplary embodiment can be the minimum required for a demultiplexer that receives an input serial data stream and outputs two or more parallel data streams that are derived from the serial data stream. In this exemplary demultiplexer, each of the outputs can either keep its previous value or change to a new input value, depending on the values previously received in the input serial data stream. System 100 can implement a single level unit interval memory to perform the demultiplexing, and the generic methodology can be applied to suitable classes of high frequency post-processing blocks in a synchronous receiver, after the preamplifier, at the front end processor, or at other suitable locations in the data receiver system.

System 100 can thus operate without complex blocks necessary for clock recovery, and also does not create additional uncorrelated timing jitter due to additional paths other than the main data path, which may contain some data jitter.

Furthermore, the use of a double-loop architecture, such as for prevention of false locking to side band signals or to resolve other problems, is not required by system 100. System 100 can correct errors that might otherwise be generated after the first data edge arrives following a long period of bits having essentially the same values, such as after a long series of signals representing logic value "1" are followed by a series of signals having logic value "0." Thus, system 100 can tolerate long run length codes while having a very low bit error rate, such as by using unit interval delay cells having high accuracy. For such long run length codes, inaccuracy in the delay can cause bit flipping to occur. However, as each input transition corrects for delay inaccuracy in the unit interval delay cells, jitter does not accumulate.

Each decision for applying a necessary change to an output 108A through 108N can made based on one or more current internal state variables and a current input data value after each unit interval of time. To synchronize the data stream at serial input 106 and the internal states of state control unit 102, the unit interval can be controlled with by using a suitable delay, such as delay lines that feed back the current values of the state variables to the input to the state control unit. If the delay value is the inverse of the data rate, the decision times can be matched to the times of the arriving next data bit. System 100 can thus eliminate the need for providing minimum jitter clock recovery circuits by using accurate delay lines for data recovery.

Figure 2:
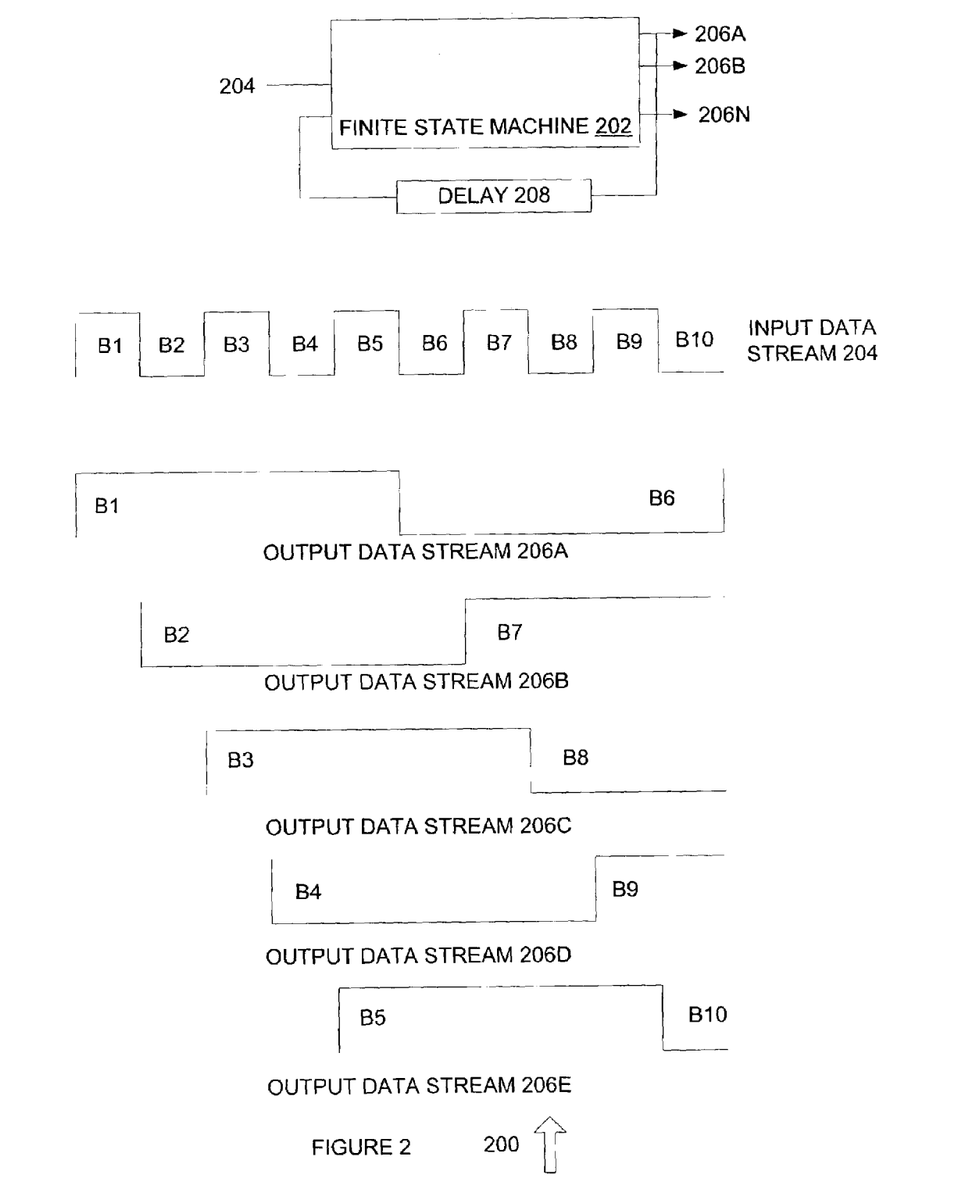
FIG. 2 is a diagram of a system for demultiplexing a serial data input stream in accordance with an exemplary embodiment of the present invention.

FIG. 2 is a diagram of a system 200 for demultiplexing a serial data input stream in accordance with an exemplary embodiment of the present invention. System 200 includes finite state machine 202 which receives serial input data stream 204 and outputs parallel data streams 204A through 204N, which can include one or more state variable outputs. Unit interval delay 208 feeds back the output data streams 206A through 206N to finite state machine 202. Output data streams 206A through 206N can include intermediate state variable outputs as well as demultiplexer outputs and other suitable outputs.

In one exemplary embodiment, the number of parallel output data streams can be five, such that output data streams 206A, 206B, 206C, 206D, and 206E are used. In this exemplary embodiment, an input data stream 204 is provided with exemplary unit interval data values B1, B2, B3, B4, B5, B6, B7, B8, B9, and B10, although it is understood that such data streams can be continuous, data bursts, or other suitable data formats. Thus, at input data stream 204, the input data stream first unit interval received is B1. Finite state machine 202 receives input B1 and generates an output at output data stream 206A having the value of B1, which in this exemplary embodiment is logical high.

The next unit interval of data received is B2 at input data stream 204. Finite state machine 202 then generates the output B2 at output data stream 206B, which in this exemplary embodiment, is logic low. A similar process is used for output data streams 206C, 206D, and 206E, with corresponding outputs being generated equal to unit interval inputs of B3, B4, and B5, which in this exemplary embodiment are logic high, logic low, and logic high.

In this exemplary embodiment, finite state machine 202 is operating as a 1:5 demultiplexer, such that output data stream 206A then changes state according to the sixth unit interval of data received, or B6. In this exemplary embodiment, B6 has a value of logic low, such that output data stream 206A changes from the data value of B1 to B6 after five unit intervals of time. Likewise, the corresponding outputs of output data streams 206B, 206C, 206D, and 206E have an initial value corresponding to the data values at unit intervals B2, B3, B4, and B5, and change state after five unit intervals to the data values at unit input intervals B7, B8, B9, and B10. It should also be noted that none of the outputs are representative of intermediate state variables, although such intermediate state variables may be required in some configurations.

In another exemplary embodiment, system 200 can be described to work in the following manner. An input data stream 204 of bits of data (B1, B2, B3, B4, B5, B6, B7, B8, B9, B10) is received in a single serial data stream. The bits of data are then split into five parallel data stream outputs (206A, 206B, 206C, 206D, and 206E) such that each bit is distributed in the order it is received to the next successive parallel data output until the last parallel data output is received, at which point the process begins again at the first parallel data output. The change in state of each output is delayed by a number of unit intervals related to the demultiplexing ratio, e.g., for a 1:N demultiplexer, the first parallel data output is not delayed, the second parallel data output is delayed by 1 unit interval delay, and so forth until the Nth parallel data output is reached, which is delayed by an N–1 unit interval delay. The serial data allocation then returns to the first parallel output after the previous output state has been maintained for a period of N unit intervals of time:

| Input Data Stream 204 UI | Assigned to Parallel Output |
|---|---|
| B1 | 206A |
| B2 | 206B |
| B3 | 206C |
| B4 | 206D |
| B5 | 206E |
| B6 | 206A |
| B7 | 206B |
| B8 | 206C |
| B9 | 206D |
| B10 | 206E |

In this manner, an input data stream 204 that is received at a high rate of transmission that can be difficult to synchronize to using conventional processes, such as those that utilize phase locked loops and clocks, can be "slowed down" by splitting the input serial data stream into a suitable number of parallel data streams at proportionally slower bit rates. In this manner, locking on a data stream can be accomplished faster, with less loss of data or without complex data formats that may be required for clock synchronization and data recovery.

In operation, system 200 provides for clockless data recovery at high data rates by effectively slowing down the data transmission rate by demultiplexing the data into a predetermined number of parallel data streams. System 200 effectively works as a 1:N demultiplexer, where the state of each of the parallel data outputs is maintained so as to slow down the effective data transmission rate. In this manner, traditional phase locked loop processes can be used to recover the data without the need for high frequency clock signals.

Figure 3:
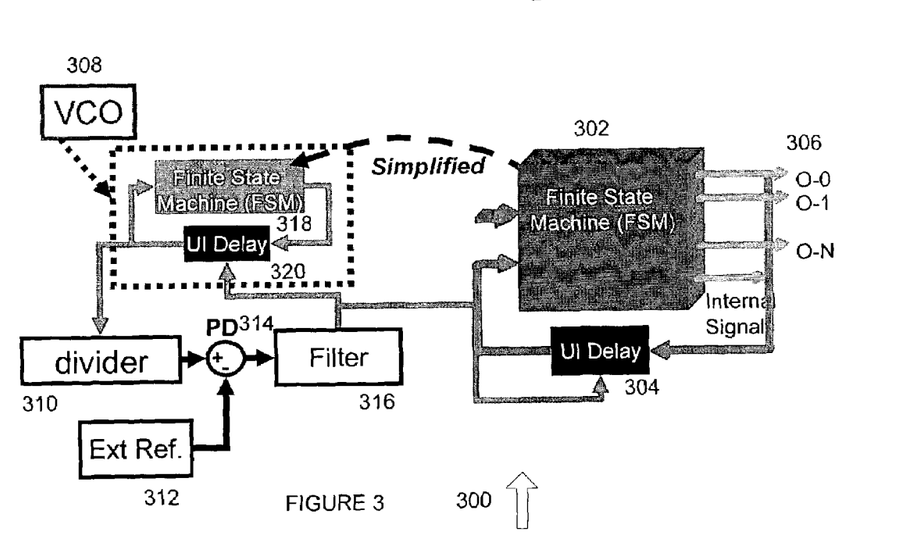
FIG. 3 is a diagram of a system for clockless data recovery with adjustable delay in accordance with an exemplary embodiment of the present invention.

FIG. 3 is a diagram of a system 300 for a clockless data recovery system with adjustable delay in accordance with an exemplary embodiment of the present invention. System 300 includes a phase locked loop that is used to compensate for effects that change delay values from one unit interval. Because a delay value is used to allocate the incoming data stream to the parallel output data streams, the accuracy of the delay values must be controlled to prevent loss of synchronization with the input serial data stream. The phase locked loop of system 300 can be used to tune the delay value to an external reference 312. Voltage controlled oscillator 308 in the phase locked loop of system 300 can be implemented as a simplified version of finite state machine 318 and unit interval delay 320, such as by using a primary finite state machine 302 with grounded input and unit interval delay 304. In this configuration, the system acts as an oscillator with a frequency of oscillation in direct relation to the delay value of the unit delay 320. When voltage controlled oscillator 308 is used in a phase locked loop, external reference 312 is compared with the divided frequency of oscillation from divider 310 using a phase detector 314. The control voltage of the voltage controlled oscillator 308 is generated after the input serial data is filtered through a low pass filter 316. This control voltage tunes the delay which in turn adjusts the oscillation frequency of the voltage control oscillator 308 to the proper value. The control voltage of the voltage control oscillator 308 can then be used to tune the delay of the primary system comprised of finite state machine 302, output 306, and unit interval delay 304. If external reference 312 is selected such that the delay in the simplified system is tuned to the desired value, then the delays in the primary system can also be adjusted to a predetermined value. Note that voltage control oscillator 308 comprises finite state machine 318 and unit interval delay 320.

In operation, system 300 allows an external reference and voltage control oscillator to be used to generate a correcting signal for a unit interval delay for use in a clockless synchronous data recovery system. The control voltage generated by the finite state machine 318 and unit interval delay 320 tunes the delay which in turn adjusts the oscillation frequency of the voltage control oscillator to the proper value. In this manner, the unit interval delay can be adjusted to match the unit interval delay of the transmitted data.

Figure 4:
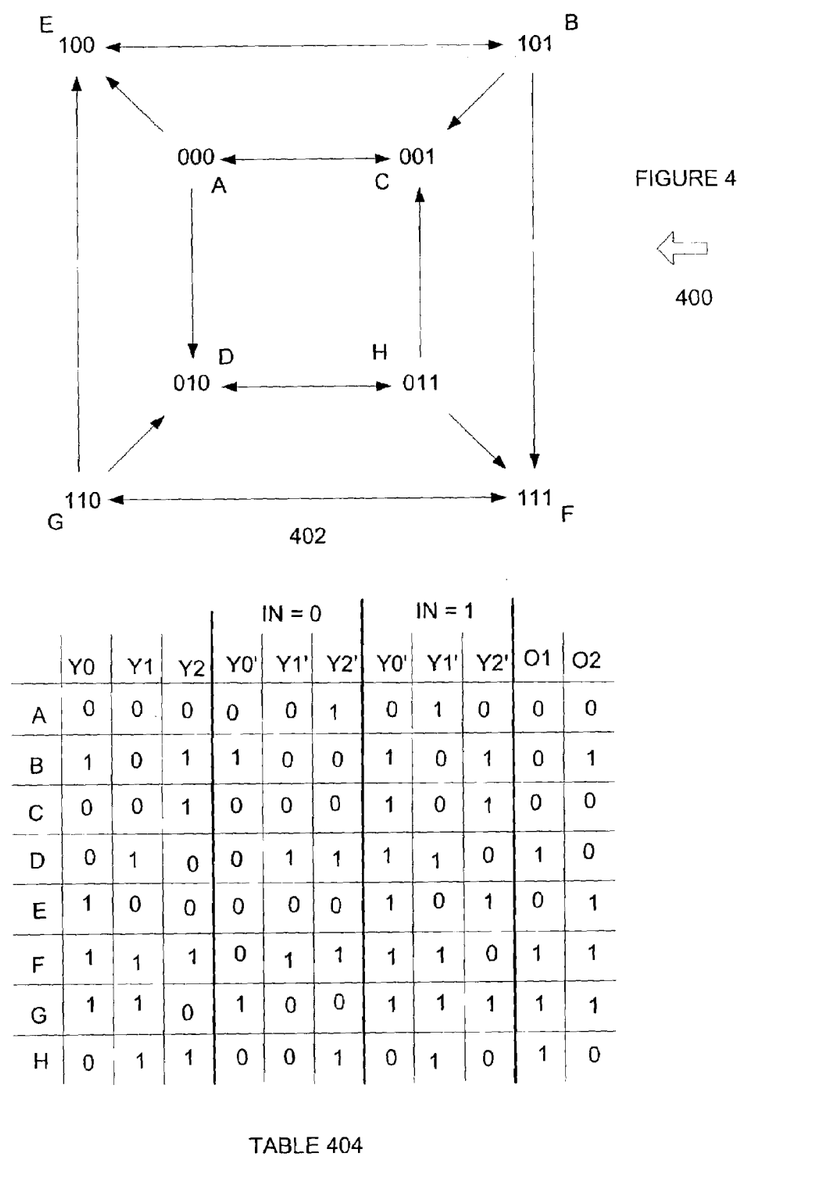
FIG. 4 is a diagram of a system for determining exemplary state transitions for clockless data recovery in accordance with an exemplary embodiment of the present invention.

FIG. 4 is a diagram of a system 400 for determining exemplary state transitions for clockless data recovery in accordance with an exemplary embodiment of the present invention. System 400 can be used to develop logic for a state machine for a 1:2 demultiplexer, but can likewise be extended to 1:N demultiplexer configurations.

System 400 includes code assignment diagram 402 which shows a race-free transition scheme in which each transition involves only a single bit change. For example, beginning with state A having input sequence 000, the allowed transitions are from A to E, or 000 to 100, from A to C, or from 000 to 001, and from A to D, or from 000 to 010. Likewise, a change in state from state D or 010 to state H or 011 is permitted, but a transition from state D or 010 to state G or 110 is blocked.

In general, the state machine has one input with a bit rate R/B and two outputs each with half the bit rate. The two outputs are demultiplexed from the input. The flow of the data, and specifically the redirection of the input to the outputs, depends on the current state of the system, and the previous values of the outputs. Based on the state of the system, the input will be copied to one of the outputs, while letting the other output keep its previous value (for a 1:2 demultiplexer—for other demultiplexer ratios, the input will be copied to the next output in the predetermined output sequence). Hence, in a 1:2 demultiplexer, the system will need three degrees of freedom to function properly: the current input, the output to be changed, and the previous value of the output which is not to be changed. In this exemplary 1:2 demultiplexer, an eight state finite state machine can be designed based on the simple analysis as shown in the following state table:

| Current State | Input is 0 | Input is 1 | Output 1 | Output 2 |
|---|---|---|---|---|
| S'$_{0,0}$ | S$_{0,0}$ | S$_{1,0}$ | 0 | 0 |
| S'$_{1,0}$ | S$_{0,1}$ | S$_{1,1}$ | 0 | 1 |
| S$_{0,0}$ | S'$_{0,0}$ | S'$_{1,0}$ | 0 | 0 |
| S$_{1,0}$ | S'$_{0,1}$ | S'$_{1,1}$ | 1 | 0 |
| S$_{0,1}$ | S'$_{0,0}$ | S'$_{1,0}$ | 0 | 1 |
| S$_{1,1}$ | S'$_{0,1}$ | S'$_{1,1}$ | 1 | 1 |
| S'$_{1,1}$ | S$_{0,1}$ | S$_{1,1}$ | 1 | 1 |
| S'$_{0,1}$ | S$_{0,0}$ | S$_{1,0}$ | 1 | 0 |

In table 404, states A through H are shown as the current state. In the state table above, S'$_{I,J}$ in the first column is the current state and in the next two columns is the next state. The prime indicates that the output that is to be changed that the next incoming input is the second output. "I" and "J" are the value for the enabled output and the value for the disabled output that should be stored, respectively. As mentioned above, for other demultiplexing ratios, such as 1:3, 1:4 and so forth, the state table can be changed and the logical design of the demultiplexer can be modified.

For example, in a 1:4 demultiplexer, the total number of states can thus be 64 and the state table can be adjusted accordingly to represent all of these states. It can be shown that the number of states for a 1:N demultiplexer is $N \times 2^N$. Based on the derived state table, a hazard-free, race-free finite state machine can be designed. The finite state machine can be implemented using different asynchronous schemes based on digital logic. One example is to use a Karnaugh map design after assigning codes to the states in a state table and to use digital gates to implement those state transitions. The code assignment is a critical step in generating race-free, hazard-free state equations. Different code assignment schemes can be used that may result in different designs. One exemplary embodiment for the procedure is shown for the state table for a 1:2 demultiplexer with the finite state machine implementation shown in FIGS. 5 through 8. For example, consider the following Karnaugh maps for three state variables ($Y_0^*$, $Y_1^*$, and $Y_2^*$) and two outputs (O1 and O2), which are used to generate the state table (in this description, the "strike-through" used to indicate a state variable that has been processed by the "NOT" function):

| | Karnaugh Map for intermediate State $Y_0^*$ | | | |
|---|---|---|---|---|
| | | $Y_0Y_1$ | | |
| $Y_2$IN | 0,0 | 0,1 | 1,1 | 1,0 |
| 0,0 | 0 | 0 | 1 | 0 |
| 0,1 | 0 | 1 | 1 | 1 |
| 1,1 | 1 | 0 | 1 | 1 |
| 1,0 | 0 | 0 | 0 | 1 |

$Y_0^* = (\overline{Y_2} \cdot Y_0 \cdot Y_1) + (\overline{Y_2} \cdot IN \cdot Y_1) + (Y_0 \cdot IN) + Y_0\overline{Y_1}Y_2 + \overline{Y_1}Y_2IN$ Karnaugh Map for Intermediate State $Y_1^*$

| $Y_2$IN | $Y_0Y_1$ | | | |
|---|---|---|---|---|
| | 0,0 | 0,1 | 1,1 | 0,1 |
| 0,0 | 0 | 1 | 0 | 0 |
| 0,1 | 1 | 1 | 1 | 0 |
| 1,1 | 0 | 1 | 1 | 1 |
| 1,0 | 0 | 0 | 1 | 0 |

$Y_1^* = (Y_1 \cdot \text{IN}) + (\overline{Y}_2 \cdot \text{IN} \cdot \overline{Y}_0) + (\overline{Y}_0 \cdot Y_1 \cdot \overline{Y}_2) + (Y_2 \cdot \text{IN} \cdot Y_0) + (Y_0 \cdot Y_1 \cdot Y_2)$ Karnaugh Map for Intermediate State $Y_2^*$

| $Y_2$IN | $Y_0Y_1$ | | | |
|---|---|---|---|---|
| | 0,0 | 0,1 | 1,1 | 1,0 |
| 0,0 | 1 | 1 | 0 | 0 |
| 0,1 | 0 | 0 | 1 | 1 |
| 1,1 | 1 | 0 | 0 | 1 |
| 1,0 | 0 | 1 | 1 | 0 |

$Y_2^* = (\overline{Y}_0 \cdot \overline{Y} \cdot \overline{Y}_2) + (\overline{Y}_0 \cdot Y_1 \cdot \overline{\text{IN}}) + (\overline{Y}_2 \cdot \text{IN} \cdot Y_0) + (Y_0 \cdot \overline{Y}Y_1 \cdot \text{IN}) + (Y_2 \cdot \text{IN} \cdot \overline{Y}_1) + (Y_1 \cdot Y_2 \cdot \overline{\text{IN}})$ Karnaugh Map for Output O1

| $Y_1$ | $Y_0Y_1$ | | | |
|---|---|---|---|---|
| | 0,0 | 0,1 | 1,1 | 1,0 |
| 0 | 0 | 1 | 1 | 0 |
| 1 | 0 | 1 | 1 | 0 |

$O_1 = Y_1$

Karnaugh Map for Output O2

| $Y_2$ | $Y_0Y_1$ | | | |
|---|---|---|---|---|
| | 0,0 | 0,1 | 1,1 | 1,0 |
| 0 | 0 | 0 | 1 | 1 |
| 1 | 0 | 0 | 1 | 1 |

$O_2 = Y_0$

In operation, system 400 can be used to design logic to implement a 1:2 demultiplexer for implementation of a clockless synchronous data recovery and demultiplexer. Although a 1:2 configuration is demonstrated, similar analyses can be used to generate logic for a 1:3, 1:4, or other suitable demultiplexing schemes.

Figure 5:
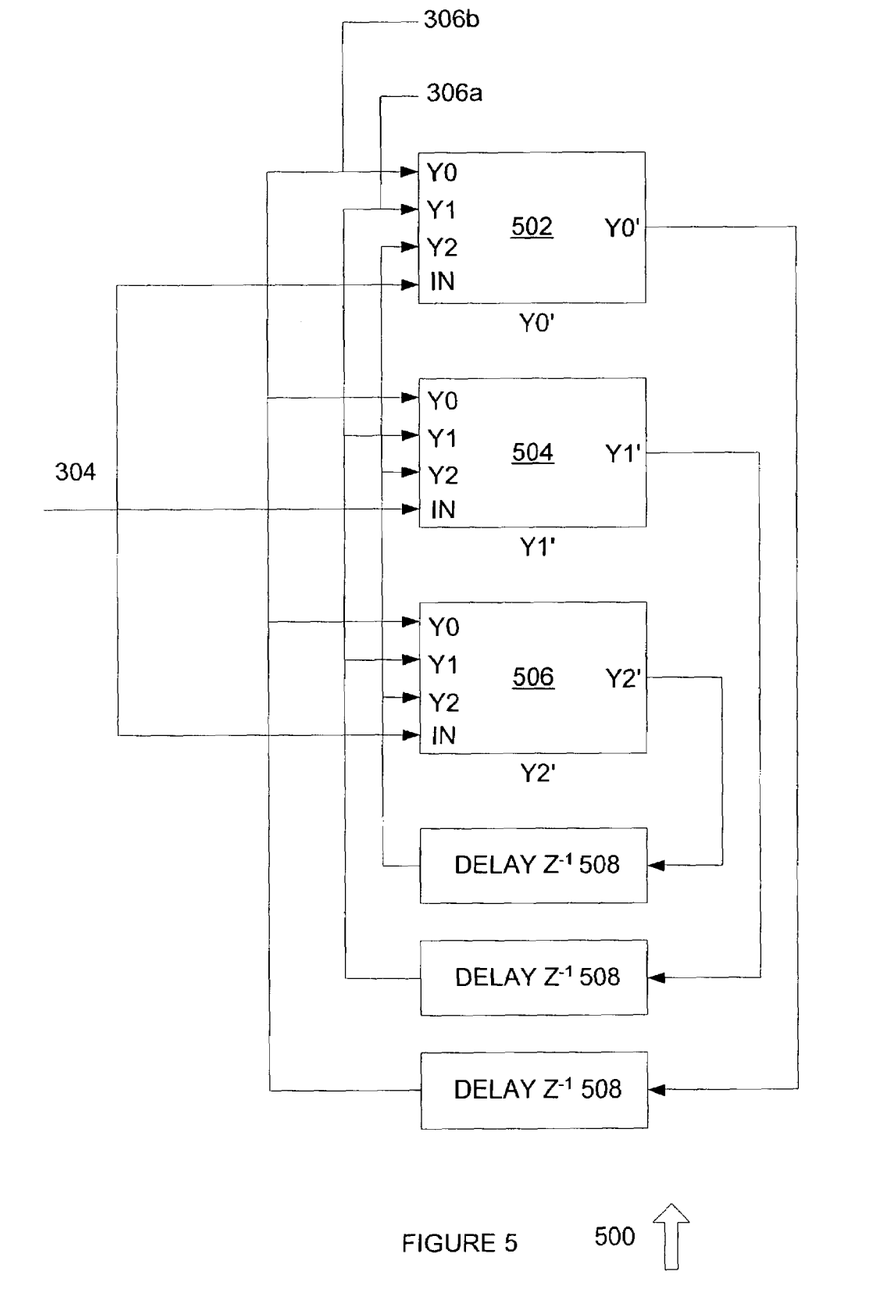
FIG. 5 is a diagram of a system for an exemplary 1:2 finite state machine system demultiplexer for clockless synchronous data recovery in accordance with an exemplary embodiment of the present invention.

FIG. 5 is a diagram of a system 500 for an exemplary 1:2 finite state machine system demultiplexer for a clockless synchronous data recovery circuit in accordance with an exemplary embodiment of the present invention. System 500 includes logic units 502, 504, and 506, which receive serial data input 304 and intermediate data values $Y_0$, $Y_1$, and $Y_2$, and which output $Y_0'$, $Y_1'$, and $Y_2'$, which are each values of intermediate data values delayed by appropriate delay factors represented by delay $Z^{-1}$ 508. In this exemplary embodiment, delay $Z^{-1}$ 508 is a unit delay, and can be a variable unit delay or other suitable delays. The outputs of the 1:2 multiplexer are 306A and 306B, such that serial data received at serial data input 304 is output and sequenced starting from 306A to 306B and then back to 306A again. Thus, for a binary input data sequence of "A-B-C-D-E-F," the output at 306A would be "A-C-E" and the output at 306B would be "B-D-F."

In operation, system 500 implements a finite state machine for a 1:2 demultiplexer that generates two parallel data outputs having unit interval data bit rates of one-half of the input received at data input 304. System 500 allows serial data to be received in a clockless manner, such that a clock running at a controlled frequency equal to the data transmission frequency is not required.

Figure 6:
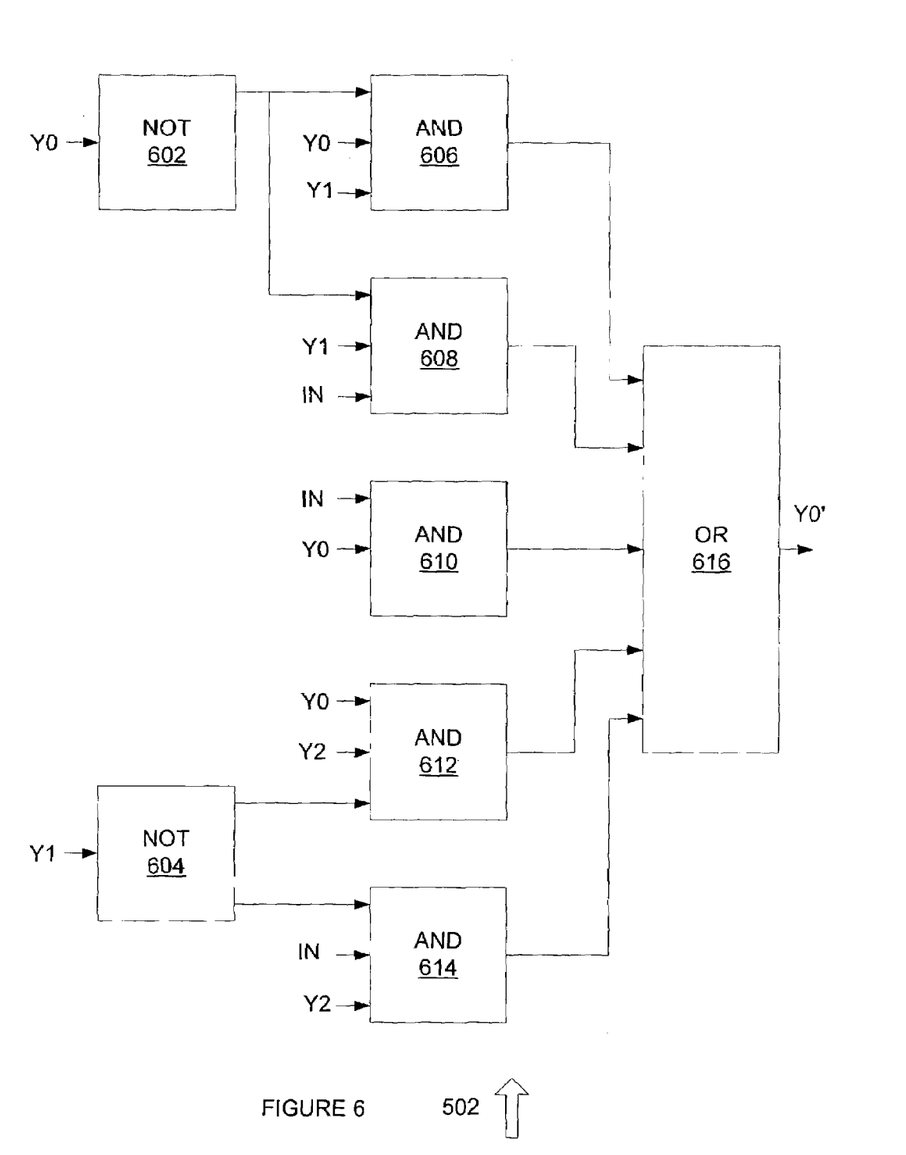
FIG. 6 is a diagram of a first system for implementing demultiplexer logic in a clockless serial data recovery system in accordance with an exemplary embodiment of the present invention.

FIG. 6 is a diagram of a system 504 for implementing demultiplexer logic in a clockless serial data recovery system in accordance with an exemplary embodiment of the present invention. System 502 includes NOT gates 602 and 604, which receive intermediate state variables Y.sub.0 and Y.sub.1, respectively. NOT gate 602 generates outputs to AND gate 606 and AND gate 608. Likewise, NOT gate 604 generates outputs to AND gate 612, and AND gate 614.

AND gate 606 receives the input from NOT gate 602 and an input for intermediate state variables $Y_0$ and $Y_1$, and generates an output to OR gate 616.

AND gate 608 receives an input from NOT gate 602 and intermediate state variable $Y_1$ and the current input data value IN and generates an output to OR gate 616.

AND gate 612 receives the current input data value IN and the value for an intermediate state variable $Y_0$ and generates an output to OR gate 616.

AND gate 612 receives the current value for intermediate state variables $Y_0$ and $Y_2$, as well as the output from NOT gate 604 and provides an output to OR gate 616.

AND gate 614 receives the output from NOT gate 604 the current value of the input, and the current value of intermediate state variable $Y_2$ and generates an output to OR gate 616. OR gate 616 generates the next value for $Y_0$, or $Y_0'$, which is delayed by a unit interval delay.

In operation, system 502 provides an exemplary logic diagram for a stage in a finite state machine for demultiplexing in a clockless synchronous data recovery system. In one exemplary embodiment, system 502 can be used in a 1:2 demultiplexer, or other logic configurations can be used for a 1:2 demultiplexer, a 1:3 demultiplexer a 1:4 demultiplexer, or other suitable demultiplexing circuits.

Figure 7:
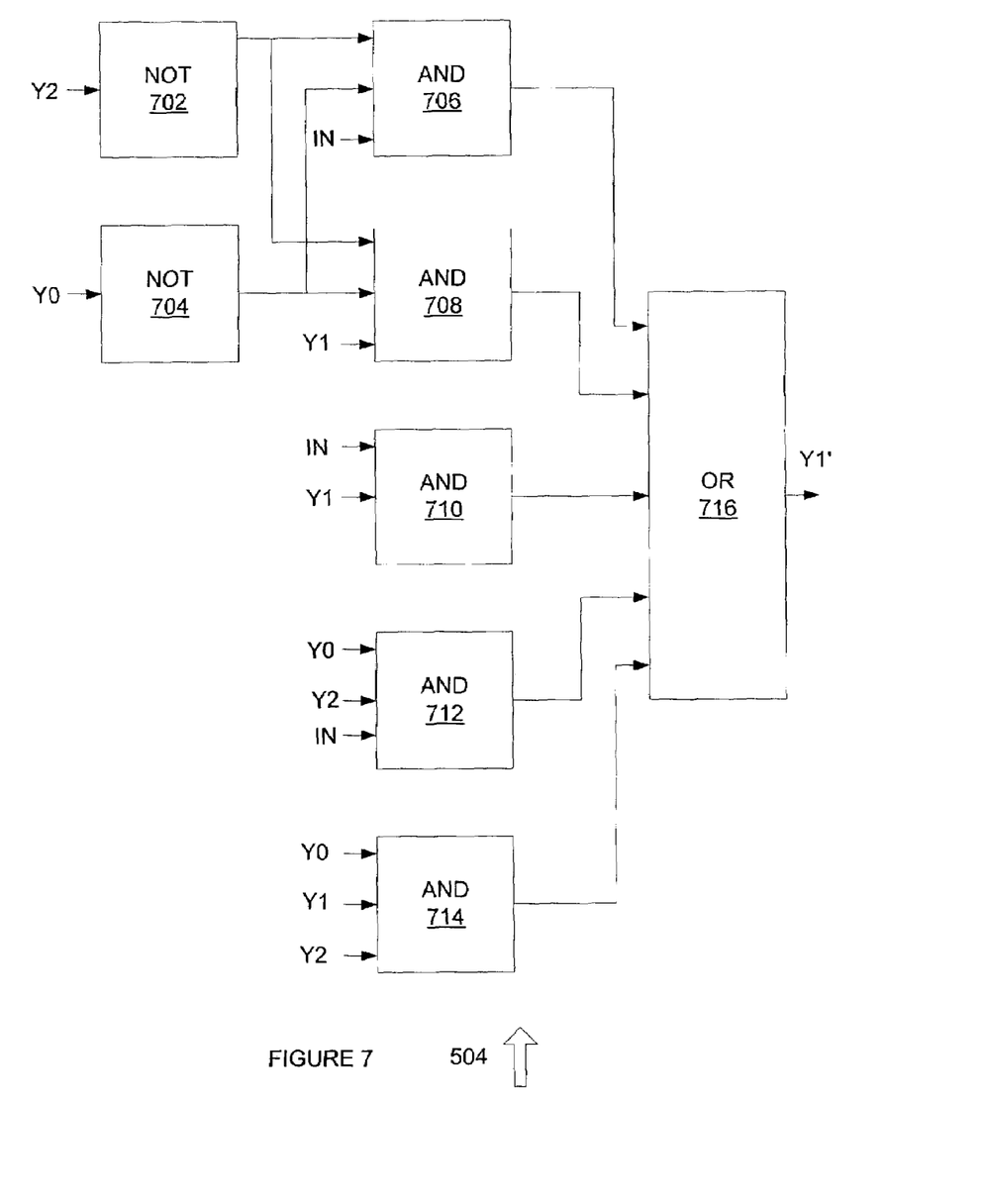
FIG. 7 is a diagram of a second system for implementing demultiplexer logic in a clockless serial data recovery system in accordance with an exemplary embodiment of the present invention.

FIG. 7 is a diagram of a system 504 for implementing demultiplexer logic in a clockless serial data recovery system in accordance with an exemplary embodiment of the present invention. System 504 includes NOT gates 702 and 704. NOT gate 702 receives intermediate state variable Y.sub.2 and outputs NOT values of the variable to AND gate 706 and AND gate 708. NOT gate 704 receives intermediate state variable Y.sub.0 and outputs NOT values to AND gate 708 and AND gate 706.

AND gate 706 receives the current serial input IN data value and outputs from NOT gate 702 and NOT gate 704 and generates an output to OR gate 716.

AND gate 708 receives outputs from NOT gate 702 and NOT gate 704 and the value of intermediate state variable $Y_1$ and generates an output to OR gate 716.

AND gate 710 receives the current serial input IN data value and intermediate state variable $Y_1$ and generates an output to OR gate 716.

AND gate 712 receives intermediate state variable data values $Y_0$ and $Y_2$ and current serial input IN data value and generates an output to OR gate 716.

AND gate 714 receives intermediate state variable data values $Y_0$, $Y_1$, and $Y_2$, and generates an output to OR gate 716.

OR gate 716 receives output from AND gates 706, 708, 710, 712, and 714, and generates the next value of intermediate state variable value $Y_1$, or $Y_1'$, which is delayed by a unit interval delay.

In operation, system 504 provides an exemplary logic diagram for a stage in a finite state machine for demultiplexing in a clockless synchronous data recovery system. In one exemplary embodiment, system 504 can be used in a 1:2 demultiplexer, or other logic configurations can be used for a 1:2 demultiplexer, a 1:3 demultiplexer a 1:4 demultiplexer, or other suitable demultiplexing circuits.

Figure 8:
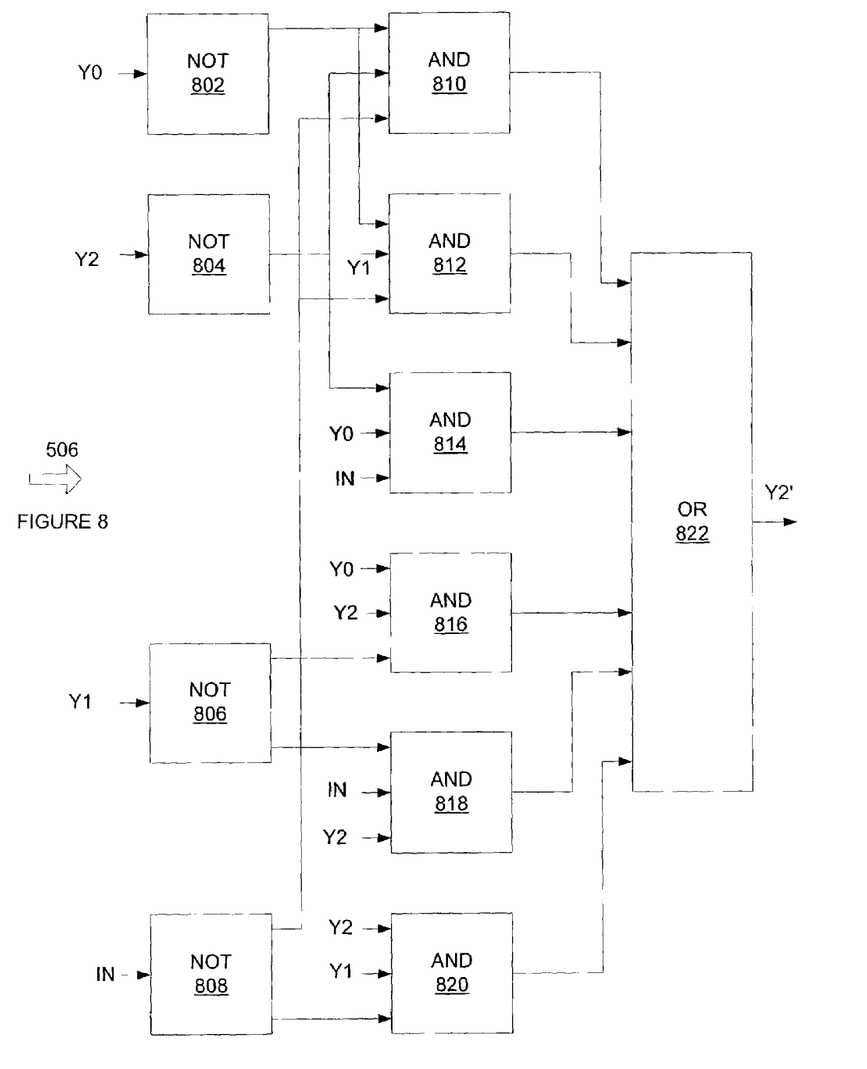
FIG. 8 is a diagram of a third system for implementing demultiplexer logic in a clockless serial data recovery system in accordance with an exemplary embodiment of the present invention.

FIG. 8 is a diagram of a system 506 for implementing demultiplexer logic in a clockless serial data recovery system in accordance with an exemplary embodiment of the present invention.

System 506 includes NOT gates 802, 804, 806, and 808, and AND gates 810, 812, 814, 816, 818, and 820, and OR gate 822. NOT gate 802 receives intermediate state variable input $Y_0$ and generates NOT outputs to AND gates 810 and 812.

NOT gate 804 receives intermediate state variable input $Y_2$ and generates NOT outputs to AND gate 810 and AND gate 814. NOT gate 806 receives intermediate state variable input $Y_1$ and generates NOT outputs to AND gates 816 and 818.

NOT gate 808 receives inputs from the current serial data variable IN value and generates a NOT output of the IN value to AND gates 810, 812, and 820.

AND gate 810 receives inputs from NOT gate 802, NOT gate 804, and NOT gate 808 and generates an output to OR gate 822.

AND gate 812 receives inputs from NOT gate 802, NOT gate 804, and intermediate state variable input $Y_1$, and generates an output to OR gate 822.

AND gate 814 receives the output from NOT gate 804, and input from intermediate state variable input $Y_0$, and the current data variable IN value input and generates an output to OR gate 822.

AND gate 816 receives intermediate state variable inputs $Y_0$, $Y_2$, and the output from NOT gate 806 and generates an output to OR gate 822.

AND gate 818 receives the output from NOT gate 806, input from intermediate state variable input $Y_2$, and the current data variable IN value input and generates an output to OR gate 822.

AND gate 820 receives an input for intermediate state variable inputs $Y_2$ and $Y_1$, and the output of NOT gate 808, and generates an output to OR gate 822.

OR gate 822 receives inputs from AND gates 810, 812, 814, 816, 818, and 820, and generates the output for the next state of $Y_2$, or $Y_2'$.

In operation, system 506 provides an exemplary logic diagram for a stage in a finite state machine for demultiplexing in a clockless synchronous data recovery system. In one exemplary embodiment, system 506 can be used in a 1:2 demultiplexer, or other logic configurations can be used for a 1:2 demultiplexer, a 1:3 demultiplexer, a 1:4 demultiplexer, or other suitable demultiplexing circuits.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for clockless synchronous data recovery comprising:

an input rate demultiplexer receiving a serial data stream of bits of data transmitted at a bit rate and generating two or more parallel data streams from the serial data stream; and one or more adjustable delays coupled to the input rate demultiplexer, each delay receiving one of the generated parallel serial data streams and delaying bits of data and feeding them back to the input rate demultiplexer, wherein the adjustment of the delays is done automatically such that the delays have a predetermined value associated with the bit rate, wherein the adjustment of the delays is done with a phase-locked loop with reference to a timing reference, wherein the phase-locked loop further comprises:

a second input rate demultiplexer generating a periodic signal;

one or more second delays coupled to the second input rate demultiplexer, each second delay receiving the periodic signal and feeding it back to the second input rate demultiplexer; and a comparator comparing the periodic signal to the timing reference and adjusting the delay based on the output of the comparison.

2. The system of claim 1 wherein the adjustment of the delays is done with reference to a timing reference.

3. The system of claim 1 wherein the delay is continuously adjustable.

4. The system of claim 1 wherein the input rate demultiplexer comprises input rate demultiplexer means for receiving the serial data stream of bits of data transmitted at the bit rate and generating the two or more parallel data streams from the serial data stream.

5. The system of claim 4 wherein the input rate demultiplexer means further comprises Karnaugh map means for determining state transitions.

* * * * *

UNITED STATES PATENT AND TRADEMARK OFFICE
CERTIFICATE OF CORRECTION

PATENT NO.       : 7,274,230 B2                                      Page 1 of 1
APPLICATION NO.  : 10/423378
DATED            : September 25, 2007
INVENTOR(S)      : Seyed-Ali Hajimiri and Behnam Analui It is certified that error appears in the above-identified patent and that said Letters Patent is hereby corrected as shown below:

Col. 10, line 42, please change "a" to -- the -- ;

Col. 10, line 43, please change "the delay is" to -- one or more of the delays are -- .

Signed and Sealed this

Twenty-fifth Day of December, 2007

JON W. DUDAS
*Director of the United States Patent and Trademark Office*